3,432,595
MELANOMA CELL LINE OF CANINE ORIGIN, ITS PROPAGATION AND USE, AND VACCINES DERIVED THEREFROM

Louis Kasza, Columbus, Ohio, assignor to The Ohio State University, Columbus, Ohio, an institution of Ohio
No Drawing. Filed June 30, 1965, Ser. No. 468,582
U.S. Cl. 424—89    10 Claims
Int. Cl. A61k 23/00

---

ABSTRACT OF THE DISCLOSURE

Viable canine melanoma "cell line M" cells on a synthetic growth-supporting medium together with a viable virus normally unindigenous to the canine "cell line M" cells, but to which the canine "cell line M" cells are susceptible, growing in the culture of canine "cell line M" cells as host; method for the propagation of such normally unindigenous virus by growing on the canine "cell line M" culture; vaccines comprising a canine virus propagated in such a viable canine melanoma "cell line M" cell culture; method of producing a vaccine comprising propagating a canine virus in a viable canine melanoma "cell line M" cell culture on a synthetic medium and harvesting the virus; method of immunizing animals against canine viruses comprising administering vaccines made in such manner; and method of attenuating a virus comprising culturing the same on a canine melanoma "cell line M" cell culture, harvesting the virus, and repeating the procedure until the virus is attenuated.

---

The present invention relates to a novel melanoma cell line of canine origin, its propagation and use, and antigens and vaccines derived therefrom, and is more particularly concerned with the propagation of said novel and stable cell line, hereinafter referred to as "cell line M," on a synthetic medium and under conditions which support its growth, with the propagation of viruses in the said cell line to produce amounts of the virus which are detectable and isolatable, with the use of the said cell line or its anti-melanomic activity or metabolites by administration into animals for the prevention or amelioration of melanoma and related disabilities, the use of the viruses propagated in the said cell line by administration either alone or together with "cell line M" cell material by administration into animals for the prevention or amelioration of disabilities caused by said virus, with vaccines embodying the said "cell line M" cell material or the antimelanomic activity or metabolites thereof or the said virus propagated in the said cell line either alone or together with whole or partial cells of the said cell line, with combinations of the said "cell line M" cells with a virus propagated therein, with use of the "cell line M" cells to test for the presence of virus in a suspected material, with a method of preparing the said vaccines, with a method of attenuating a virus by use of the said "cell line M," and with the virus so attenuated.

The novel melanoma cell line of the present invention is of canine origin, which makes it especially adaptable to the production of vaccines for canine ailments or disabilities. It is thus moreover especially suited for use in the propagation of viruses which attack the canine population and, from which propagation of viruses, vaccines for the treatment of canines may advantageously be produced. Of particular interest is the fact that, although the cell line of the present invention is remarkably stable, having exhibited no significant departures over a period of at least 4 years, it is also normally free of viral contamination, inasmuch as, in its normal state, the presence of any virus in the cell line is not demonstrable. Thus, no "provirus" or normally indigenous virus can be demonstrated to be present in the cell line of the invention. On the other hand, a great number of normally unindigenous viruses have been shown to propagate rapidly in the cell line of the invention, including new and hitherto unreported viruses, to produce amounts of the virus which are detectable by their cytopathic effect and isolatable if desired according to usual procedures such as centrifugation, lyophilization, extraction, or the like. Conversely, when normally unindigenous viruses are not introduced into the cell line of the invention, despite its high degree of viability involving a ten-fold reproduction in a period of only 5 days, it remains stable and unadulterated by demonstrable viruses.

As will be readily apparent to one skilled in the art, such a stable uncontaminated cell line has great potential value, not only from the standpoint of reproduction or self-propagation with its attendant use in the form of whole or partial cells, or its anti-melanomic acitivity or metabolites, as a constituent of a vaccine for the treatment of animals subject to melanoma or related disabilities, but also as a medium for the propagation of normally foreign or unindigenous viruses, either known or novel, for the production of detectable and isolatable amounts of the virus, not only to prove the existence of viruses or suspected viruses but to enable their isolation and use in the treatment of animals afflicted therewith, either in isolated form or together with whole or partial cells of the particular cell line of the present invention. In this latter capacity as a medium for the propagation of virus for incorporation into vaccines, the cell line of the present invention is a notable and rather remarkable replacement for presently employed media, such as monkey kidney tissue or the like, which are currently employed for serial attenuation of viruses.

It is accordingly an object of the present invention to provide the novel melanoma cell line referred to herein as "cell line M," a method for its propagation, a method for the propagation of viruses therein, the cell line growing on a synthetic medium, the combination of the cell line growing on a synthetic medium together with a normally unindigenous virus, vaccines embodying whole or partial cels from the said cell line or its activity or metabolites, vaccines embodying viruses propagated in the said cell line, alone or together with whole or partial cells from the said cell line, a method of making the said vaccines from the said cell line, and a method of testing for viruses using the said cell line. Additional objects will be apparent to one skilled in the art, and still other objects will become apparent hereinafter.

The foregoing and additional objects are accomplished by provision of the novel methods and products of the present invention, which will be discussed in greater detail hereinafter. Of over 50 canine tumor cell cultures isolated and tested during the course of the instant research, only two tumor cells were found to have satisfactory characteristics for the establishment of stable and useful cell lines including stability, integrity, purity, reproducibility, propagation rate, and additional favorable characteristics to warrant further study leading toward the accomplishment of the objects of the present invention.

I. SOURCE AND IDENTIFYING CHARACTERISTICS OF "CELL LINE M"

The melanoma culture material was obtained from a 7-year-old male Boxer. At necropsy, a 30-cm. long, 16-cm. wide, and 12-cm. thick mass was found in the skin on the right humeroscapular region. The regional lymph nodes were enlarged. The cut surface of the mass and the regional lymph nodes were black. The lungs and the prostrate had numerous metastases, with nodules 0.2 to 3.0 cm. in diameter. A 25-gm. piece of turmor tissue was aseptically collected immediately after euthanasia from the most uniform part of the primary neoplasm. A part of the same mass was fixed in formalin for histopathology. The sample collected for culture was black, with fine white connective tissue septums. There was no evidence of tissue necrosis; the histopathologic diagnosis was malignant melanoma. The tissue cultures were prepared from the same part of the neoplasm.

The cells were separated from the cut tissue in 0.25% trypsin. After 1 hour, the sedimented cells were dispersed in lactalbumin and Difco 199 mediums. Both mediums contained 5% bovine and 5% ovine serum. After 24 hours, 2,000,000 cells were settled on the surface of 100-ml. prescription bottles. On the 2nd and 3rd days the cells did not multiply, but individual spreading was observed. The media were changed on the 2nd and 6th days, using the original concentration of serum and 2 and 3% soldium bicarbonate solutions, respectively. At this time, the cell population did not increase markedly, and the culture had about double the original number of cells. On the 7th day, there was slight cell degeneration, with necrosis, in the culture, and cell debris appeared in the medium. At this stage, the cultures were transferred in a 1:1 ratio of old cultures to new, using the same media as before.

The 1st passages were mixed cultures having about 97.9% melanoblasts, 2.0% fibroblastic cells, and 0.1% epithelioid cells. The fibroblast-like cells died, but the epithelioid cells grew better than the melanocytes. By the 4th passage, they already represented about 50% of the cell population. To prevent complete overgrowth with epithelioid cells, a clone was started from an individual melanoblast in the 5th passage and a pure melanoma cell line prepared.

During the passages, the cells underwent morphologic changes which were regularly detected during all of the following passages. The trypsinized cells were small (10 to 14$\mu$ in diameter), with a thin rim surrounding the nuclei. The cytoplasm started to spread after a few hours and the cells became more and more polygonal but had a tendency to retain bipolar shape. Two or more processes developed, and the longest grew toward the nearest cells. They reached each other and the cells moved closer. A tropism among the cells was easily observed. The fully developed cells were 20 to 30$\mu$ long. The shape of the cells was irregular because of the processes. The nuclei occupied the central part of the cells and were moderately variable in size. The youngest cells had fine granules in their nuclei. The nuclei of the older cells were darker, and there was chromatin in larger granules. The border of the cell and the nucleus were sharply defined. The pattern of the cell sheet was lattice-like and even in the most developed cultures there were small empty lacunas between the cells. Various mediums such as Difco 159, lactalbumin hydrolysate, basal medium (Eagle), and Earle's BSS, as well as their mixtures, were tested with the 10th-passage culture. A mixture of 50% lactalbumn hydrolysate medium with 50% Difco 199 medium supported the cell growth most efficiently and was used in the subsequent passages. The capacity for proliferation increased continually, and from the 30th passage 100,000 to 150,000 cells per milliliter were needed for the transfer. The fully developed cultures per bottle had 20,000,000 to 25,000,000 cells, so the necessary cell distribution ratio was 1:1 and remained constant.

To date, the cell cultures have been transferred over 170 times. The culture transfers were prepared by 2 to 5 minutes of trpysinization. A 0.1 to 0.2% concentration of trypsin in Hanks' BSS proved adequate for trypsinization. The cultures maintained the capacity to produce an abundant amount of melanin until the 30th passage. Thereafter, the melanin appeared in smaller quantities and, around the 50th passage, melanin was not produced during a 10-day cultivation period. The cells were able to produce melanin if the cultures were kept over 14 days without transfer.

II. PROCUREMENT OF CELL LINE M FROM NATURAL SOURCES

The most viable cells from the peripheral growth of the canine melanoma as described under I were excised and subjected to trpysinization as further described under I for purposes of liberating the melanoma cells from their tissue environment.

III. PROPAGATION OF CELL LINE M ON SYNTHETIC MEDIA

Propagation of cell line M on a synthetic medium requires only that it be grown on a growth-promoting medium under growth-supporting conditions.

A. MEDIA

Essential ingredients of any growth supporting medium for cell line M include a source of assimilable carbohydrate, a source of assimilable protein or amino acids, nucleic acid, mineral (including trace elements) and vitamin components, in accord with known procedure for the maintenance and propagation of animal cells.

A great many media have been employed and found suitable including, for example, Hanks' BSS, Eagle's basal medium, Difco medium 199, Earle's BSS, and harvested media from various normal and tumor tissue cultures. Hanks' BSS plus 0.5% lactalbumin hydrolysate and Difco 199 were used as medium in most cases. Sheep serum, 1 to 10%, was frequently used in conjunction with an equal concentration of bovine serum. A 4.4% solution of sodium bicarbonate was used in concentrations up to 5% to maintain the pH in the range 7.2–7.6, preferably about 7.4. All media contained antibiotics to eliminate susceptible contaminants and 100$\mu$g. of streptomycin, 200 units of penicillin, and 20 units of nystatin per milliliter were found suitable to maintain an aseptic condition in the culture.

The complete compostion of the preferred media is as follows:

1. Hanks' BSS with lactalbumin hydrolysate medium contains grams per liter:

| | |
|---|---|
| NaCl | 8.00 |
| KCl | 0.40 |
| CaCl$_2$ | 0.14 |
| MgSO$_4$·7H$_2$O | 0.20 |
| Na$_2$HPO$_4$·12H$_2$O | 0.12 |
| KH$_2$PO$_4$ | 0.06 |
| NaHCO$_3$ | 0.35 |
| Glucose | 1.00 |
| Phenol red | 0.02 |
| Lactalbumin | 5.00 |

The *growth* medium also contains:

| | Percent |
|---|---|
| Lactalbumin hydrolysate (Hanks' BSS) | 93.0 |
| Calf serum | 2.5 |
| Lamb serum | 2.5 |
| NaHCO$_3$ (8.8%) | 1.0 |
| Antibiotics | [1]1.0 |

[1] Consists: 100$\mu$g. streptomycin, 200 units penicillin, and 20 units nystatin per milliliter of medium.

*Maintenance* medium consists of same as above except the serums, NaHCO$_3$ and lactalbumin hydrolysate which were used were:

| | Percent |
|---|---|
| Lactalbumin hydrolysate (Hanks' BSS) | 93.5 |
| Calf serum | 1.5 |
| Lamb serum | 1.5 |
| NaHCO$_3$ (8.8%) | 2.5 |
| Antibiotics | 1.0 |

These media were used in 50% concentration for the Canine Melanoma "cell line M," together with 50% of medium 2.

(2) Difco 199 medium contains milligrams per liter:

| | |
|---|---|
| Alanine | 50.0 |
| L-arginine HCl | 70.0 |
| L-aspartic acid | 60.0 |
| L-cysteine HCl | 0.1 |
| L-cystine | 20.0 |
| L-glutamic acid | 150.0 |
| L-glutamine | 100.0 |
| Glycine | 50.0 |
| L-histidine HCl | 20.0 |
| Hydroxy-L-proline | 10.0 |
| L-isoleucine | 40.0 |
| L-leucine | 120.0 |
| L-lysine HCl | 70.0 |
| L-methionine | 30.0 |
| L-phenylalanine | 50.0 |
| L-proline | 40.0 |
| L-serine | 50.0 |
| L-threonine | 60.0 |
| L-tryptophan | 20.0 |
| L-tyrosine | 40.0 |
| L-valine | 50.0 |
| p-Aminobenzoic acid | 0.05 |
| Biotin | 0.01 |
| Calcium pantothenate | 0.01 |
| Choline chloride | 0.50 |
| Folic acid | 0.01 |
| Inositol | 0.05 |
| Niacin | 0.025 |
| Niacinamide | 0.025 |
| Pyridoxal HCl | 0.025 |
| Pyridoxine HCl | 0.025 |
| Riboflavin | 0.01 |
| Thiamine HCl | 0.01 |
| Vitamin A | 0.10 |
| Ascorbic acid (vit. C) | 0.05 |
| α-Tocopherol phosphate (vit. E) | 0.01 |
| Calciferol (vit. D) | 0.10 |
| Menadione (vit. K) | 0.01 |
| Adenine | 10.0 |
| Guanine HCl | 0.3 |
| Hypoxanthine | 0.3 |
| Thymine | 0.3 |
| Uracil | 0.3 |
| Xanthine | 0.3 |
| Adenylic acid | 0.2 |
| 2-deoxy-D-ribose | 0.5 |
| D-ribose | 0.5 |
| Tween 80 (oleic acid) | 5.0 |
| Cholesterol | 0.2 |
| Glucose | 1000.0 |
| Glutathione | 0.05 |
| Sodium acetate | 50.0 |
| Adenosinetriphosphate | 10.0 |
| NaCl | 6800.0 |
| KCl | 400.0 |
| $CaCl_2$ | 200.0 |
| $MgSO_4 \cdot 7H_2O$ | 200.0 |
| $NaH_2PO_4$ | 140.0 |
| $NaHCO_3$ | 2200.0 |
| $Fe(NO_3)_3 \cdot 9H_2O$ | 0.1 |
| Phenol red | 20.0 |

The *growth* medium also contains:

| | Percent |
|---|---|
| 199 medium | 93.0 |
| Calf serum | 2.5 |
| Lamb serum | 2.5 |
| $NaHCO_3$ (8.8%) | 1.0 |
| Antibiotics | [1] 1.0 |

[1] Same concentration as described for lactalbumin hydrolysate medium.

*Maintenance* medium consists of:

| | Percent |
|---|---|
| 199 medium | 93.5 |
| Calf serum | 1.5 |
| Lamb serum | 1.5 |
| $NaHCO_3$ (8.8%) | 2.5 |
| Antiobiotics | 1.0 |

This medium was used at 50% concentration for the canine melanoma cell line, together with 50% of medium 1.

B. CONDITIONS

In accord with normal procedure for cell propagation, the propagation of cell line M on a synthetic medium is conducted at a temperature conducive to its most rapid growth, normally at or about 37° C., preferably about 35 to about 37° C. The culture medium is preferably maintained in a level horizontal position during the entire period of propagation, so that monolayer cell propagation results. After a sufficient period of propagation, for example, 5 to 7 days, a confluent monolayer cell growth is observed, with the culture exhibiting a lattice-like structure with lacunas between the cells.

The period of 5 through 7 days appears to be optimum when seeding of the medium is effected with 100,000–150,000 cells per milliliter of medium, but the period of incubation to accomplish the same results can obviously be increased or decreased by reduction or increase in the number of cells used at the outset in the seeding step. The pH range for the media during propagation should be maintained at about 6.5 to 8, preferably about 7.2 to 7.6 and most advantageously at about 7.4. At fully confluent growth, the "cell line M" cultures exhibit about 1,000,000 to 1,250,000 cells per milliliter.

C. CELL PRESERVATION

There are reports of the successful preservation of tissue and tissue culture cells at subzero temperatures. Using the same principles, we found that the cell line of the invention can be preserved for at least 1 year. The addition of 5% to 10% glycerol to the medium proved most satisfactory. The cells were trypsinized, centrifuged, and resuspended in a concentration 10 times greater than that used for transfers. The temperature of the suspension was slowly decreased in 4 hours to −70° C., and the suspension was stored at the same temperature. To prepare cultures from the frozen cells, rapid thawing in a 37% C. water bath resulted in optimal cell survival. Viability of the cells, as measured by vital staining, was related to the length of storage. After 1 month about 50% of the cells remained alive; during 1 year this percentage gradually decreased to 10%. Rapid freezing with an alcohol and solid $CO_2$ mixture or slow thawing at room temperature yielded fewer living cells. The cell line can be maintained as living stock if kept at 37° C. and the medium, at low serum concentrations, is changed every week. It has been possible to maintain cultures in this way for 1 year.

IV. INCORPORATION OF "CELL LINE M" INTO VACCINE AND ADMINISTRATION THEREOF

The "cell line M" cells are harvested and incorporated into ta vaccine or antigen composition and administered to a living animal in a generally conventional manner. For example, the cell growth is removed from the culture vessel and the cells and parts thereof are shaken in the growth medium to provide a fine cell suspension. The cells may then be disrupted by standard procedure, such as freezing and thawing or sonication. After distribution into sterile ampules or vials, and siutable testing for sterility and nonpathogenicity, the suspension of cellular material may be used directly as a vaccine or antigen composition for administration to the animal, usually by the parenteral route. If desired, the cellular material may first be lyophilized for convenient storage and/or diluted with a standard pharmacologically acceptable vaicne diluent, such as isotonic saline solution, to any desired concentration, for example, between about 10 and 90%, for use in the vaccination of living animals. After a sufficient period of incubation, the animal becomes immune and usual tests for the determination of said immunity may be employed if desired.

V. PROPAGATION OF NORMALLY UNINDIGENOUS VIRUSES IN "CELL LINE M" GROWING ON SYNTHETIC MEDIA, AND (VI) INCORPORATION OF VIRUSES INTO VACCINE AND ADMINISTRATION THEREOF

The propagation of a cirus in the "cell line M" culture as host is effected by introducing the virus in viable state into the "cell line M" culture and thereafter maintaining virus growth-supporting conditions. Further details will be apparent from Example 3. Harvesting of the virus and incorporation of the same into a vaccine or antigen preparation is generally effected in conventional manner, along the lines of the procedure given under IV for harvesting of the "cell line M" cells themselves, with suitable purification and testing as is conventional in the art. Suitable purification may be effected, e.g., by ultracentrifuging, salting out, ion exchange using suitable ion exchange resins, or the like. Control testing is also according to established procedure, and further details will again be apparent from Example 3. The virus is obviously not harvested and packaged for use as a vaccine or antigen until the tests show it to be immunogenic and nonpathogenic, as determined by the clinical and pathological responses of test cultures and animals.

The propagation of viruses in "cell line M" cultures is more particularly illustrated by Example 2, and the preparation of suitable virus vaccines or antigens, as well as use of "cell line M" for virus diagnostic purposes, are more particularly illustrated by Examples 3 and 4. As will be apparent to one skilled in the art, use of "cell line M" for diagnostic purposes, as illustrated by Example 4, provides a significant tool for the pharmacologist, clinician, or diagnostic laboratory, and obviously the most significant aspect of viral propagation by means of "cell line M" resides in its utilization for the purpose of attenuating viruses, including pathogenic viruses, especially by more than one passage through "cell line M" cells, for example, in a particular instance up to 150 passages.

This attenuation by serial passage through growing cells of "cell line M" obviously presents numerous advantages over serial passage through primary cell cultures such as monkey or dog kidney cell cultures as presently practiced, inasmuch as numerous disadvantages, including a tendency toward contamination due to latent viruses of the species of which cells are employed for the attenuation or serial passage, are attendant thereon. Such present practices also suffer from limitations imposed by an insufficient life span of the primary cell culture and the excessive time required for culture of the primary cells, as well as a distinct shortage in the number of animals available for this important economic use. Moreover, insofar as I am aware, no societies have as yet been established for the prevention of cruelty to cells.

*Materials and methods.*—Generally, 25 gm. of tumor was used for each tissue culture preparation and was selected from that portion which had the least necrosis and connective tissue. The bulk of the connective tissue was carefully dissected away, but the fine connective tissue stroma remained with the neoplastic cells.

The samples were cut into pieces not larger than 3.0 mm. in diameter and washed in Hanks' balanced salt solution (BSS) with antibiotics. For separation of the cells, 0.25% trypsin in Hanks' BSS was used at pH 7 to 8. Gentle agitation with a Teflon-coated magnetic bar helped speed the trypsinization. Depending upon the consistency of the tumor, the process required 20 minutes to 2 hours. Overtrypsinization was carefully avoided. When sufficient cells were free, the suspension was passed through a double layer of gauze and centrifuged at 600 r.p.m. for 7 minutes. Customarily, 1 ml. of cell sediment was suspended in 200 ml. of medium. Such a suspension usually contained 80,000 to 100,000 living cells per milliliter. To count the cells, the sedimented cells were resuspended in Hanks' BSS (without phenol red), stained with trypan blue or eosin, and the living and dead cells counted in a hemocytometer chamber.

Hanks' BSS plus 0.5% lactalbumin hydrolysate was used as medium in most cases. Sheep serum, 1 to 10%, was used in conjunction with an equal concentration of bovine serum. A 4.4% solution of sodium bicarbonate was used in concentrations up to 5.0% to maintain the pH close to 7.6. In addition to Hanks' BSS with lactalbumin hydrolysate, Eagle's basal medium, medium 199, Earle's BSS, and harvested media from various normal and tumor tissue cultures were also employed. Vitamins and various nucleic acid derivatives were also used for experimental supplements. All mediums contained 100 µg. of streptomycin, 200 units of penicillin, and 20 units of nystatin per milliliter.

Passages were performed when the first sign of degeneration appeared in the confluent monolayers. The cell sheets were harvested with 0.1 to 0.25% trypsin in Hanks' BSS, and the cells were divided among new cultures in ratios of 2:1 to 1:20, according to their proliferative capacity. In the 5th passage, the cultures were cloned from a single cell for further passages.

The clones were prepared from trypsinized cells which were transferred in a Leighton tube with the medium and a cover slip. When the cells had settled, after 2 to 3 hours, the medium was discarded, the cultures were washed several times, and new medium was added. The cells were observed under a microscope and, when they had grown but were still well separated, the cover slip was placed in a petri dish with the cell-containing surface up. The cells were covered with a thin agar overlay medium which fixed the slide to the petri dish. A characteristic cell was selected microscopically and picked up with a piece of surrounding agar by a dissecting needle and transferred into another tube. The selected cell settled and started to multiply in the new medium.

All experiments were performed in 100-ml. prescription bottles containing 20 ml. of medium. Parallel cultures for cytologic examinations were prepared on cover slips in Leighton tubes containing 2 ml. of medium. May-Grünwald-Giemsa stains were made routinely every other day from each lot of cultures. Other staining and histochemical reactions employed included hematoxylin and eosin, periodic acid-schiff stain, Shorr's triple stain, oil-red-O, Wilder's reticulum stain, mucicarmine, and Feulgen reaction. Tumors fixed in 5% Shein's neutral formalin were examined by the same histochemical methods.

Cell-preservation experiments were conducted, using both slow and rapid freezing processed with and without glycerol. The glycerol concentration was varied from 1 to 20%. The slow freezing process was performed by gradually decreasing the temperature to −70° C. A solid $CO_2$ and alcohol mixture was used for rapid freezing. The frozen cells were stored at −70° C.

The following examples are given by way of illustration only and are not to be construed as limiting.

Example 1.—Propagation of antigens or vaccines from the canine melanoma cells (cell line M) for immunization against tumors The cultivation of the canine melanoma cell line is as described previously, using 50% Hanks' BSS medium with 0.5% lactalbumin hydrolysate and 50% Difco 199. The cells are cultivated in 100 ml. prescription bottles at 370 C. and a confluent monolayer cell sheet is produced in about 5 days. The cells originate from cancer cells and are different in nature from the existing normal cells in the body. This different nature involves antigenic characteristics and therefore, by injection into a host, specific immunoreactions are produced. The active mobilization of the defense mechanism can arrest the development of malignant cells which are similar or identical to the cancer cells which were the source of the antigen.

PREPARATION OF THE ANTIGEN OR VACCINE (a) The confluent monolayer cell sheet is separated, as by scraping from the wall of the culture vessel.

(b) The small pieces of cells are shaken in their growth medium for 30 minutes to make a fine cell suspension.

(c) The cells are disrupted by standard methods, such as freezing and thawing or sonication.

(d) The suspension is distributed into sterile ampules or vials.

(e) The sterility and pathogenicity of the inoculum are controlled by the inoculation of the specimens into cell cultures, experimental animals and culture mediums. Only sterile, nonpathogenic inocula, as shown by these tests, are further utilized.

(f) The sterile, nonpathogenic inocula are used, if desired after suitable dilution with a standard pharmacologically acceptable vaccine diluent, e.g., isotonic saline solution, to a desired concentration, e.g., 10–90%, to vaccinate a living animal. After 14 days, the patient becomes immune. If immune serum is withdrawn, the inhibitory effect of the immune serum against "cell line M" cells in tissue culture indicates the production of specific antibodies.

Example 2.—Propagation of viruses in "cell line M"

The indication of the susceptibility of the canine melanoma cell line to a virus is the development of the cytopathic effect (CPE). As a model the propagation of canine hepatitis virus was used.

(a) The confluent monolayer cell culture of canine melanoma cell line is inoculated with 0.2 ml. of undiluted virus in 100 ml. prescription bottles.

(b) The inoculum is incubated for 30 minutes at 37° C. and growth-promoting medium (same as in Example 1) added.

(c) Parallel cultures for stain preparation were prepared in Leighton tubes with cover slips to enable evaluation of the effect of the virus on the "cell line M" cells.

(d) The CPE developed gradually and completes cell degeneration occurred within 72 hours. The most striking changes were in the nuclei. The adenovirus-type intranuclear inclusions (produced by the canine hepatitis virus) were present as a well-separated mass in the nucleus.

(e) At the peak of the CPE the medium and the cells were collected.

(f) The collected virus pool was three times frozen and thawed for liberation of the virus particles from the intranuclear inclusion bodies.

(g) The sterility of the collected virus was controlled by testing in "cell line M" and by standard methods as given in Example 1(a).

(h) Titration of the collected viral material in tissue cultures of "cell line M" and injection into susceptible animals demonstrated the viral propagation and multiplication. The animals contracted hepatitis and the tissue cultures again showed CPE.

(i) Both the pathogenic and the attenuated strains of canine hepatitis virus exhibited similar effects against "cell line M." Both strains showed CPE in the tissue cultures but only the pathogenic strain caused hepatitis in animals.

During cultivation, the attenuated strain maintained its original characteristics. The attenuation of the pathogenic strain is described in Example 3.

(j) Harvesting and preparation of a vaccine, including dilution of the virus, if desired, is in accord with conventional procedure, e.g., as indicated in Example 1. Canine distemper, vaccinia, human adenovirus, Newcastle disease virus, swine influenza virus, swine adenovirus, and *Toxoplasma gondii* organisms are all successfully cultivated in "cell line M."

Example 3.—Attenuation of pathogenic viruses by means of canine melanoma cell line (cell line M)

During serial cultivation of viruses in cell cultures, some viruses lose their pathogenic characteristic but maintain their capability for immunizing animals against the pathogenic variants. The canine melanoma cell line (cell line M) provides a means for the attenuation of pathogenic viral strains. The procedure is as follows:

(a) Confluent monolayer cell sheet of canine melanoma cell line is inoculated with a pathogenic virus strain (e.g., hepatitis, distemper, or rabies) which produces detectable CPE in this cell line.

(b) The cells and the medium containing the virus are collected when the CPE becomes obvious.

(c) The collected specimen is inoculated into "cell line M" cultures. Changes in the cultural conditions such as pH, temperature, and medium may be employed to enhance the attenuation in the case of each particular virus, if desired.

(d) Subcultures are prepared as described in (a)–(c) until the attenuation occurs, i.e., the process is repeated (serial passage).

(e) The pathogenicity of the virus is again tested by inoculation of susceptible animals with samples of the harvested virus at different intervals. The degree of attenuation is determined by the clinical and pathological response of the inoculated animal.

(f) Finally, after the test animal shows no untoward clinical or pathological response, the immunoreaction of a selected host is again tested by inoculation of a previously susceptible animal with the attenuated virus and, thereafter, by challenging the animal with a pathogenic strain.

(g) When found to be immunogenic and nonpathogenic, the virus is harvested and packaged for convenient use as a vaccine, for example, as indicated in Example 2.

Example 4.—The use of the canine melanoma "cell line M" for diagnostic purposes

"Cell line M" is susceptible to several viruses which produce visible effect in the cells. This characteristic of the cell line is utilized to detect suspected viruses if they produce detectable effect in the cells.

(a) The canine melanoma "cell line M" is inoculated with a specimen, suspected to comprise a virus, in a nontoxic concentration.

(b) The cultures are observed for CPE, as by microscopic examination.

(c) The occurrence of a known CPE indicates the presence of a virus for which the CPE is characteristic; the occurrence of a previously unrecognized CPE may indicate the presence of a novel virus.

(d) In the case of negative results, several blind passages are conducted for possible manifestation of CPE due to increased propagation of the virus or adaptation of the virus to "cell line M."

(e) The positive identification of the virus requires isolation and further serologic tests, such as neutralization, complement fixation tests, precipitation tests, hemagglutination tests, or the like.

"Cell line M" cells cannot be lost because (1) we have placed a supply of ampules containing "cell line M" cells on deposit in a public institution and available to the public, and (2) using procedures described in this application within a reasonable period we can cultivate and establish "cell line M" cells from dogs with melanoma which are patients in the Veterinary Hospital at the Ohio State University or anywhere else in the world.

Various modifications and substitutions of equivalents may be made in the methods, products, compositions, materials, and procedures of the present invention without departing from the spirit or scope thereof and will be readily apparent to one skilled in the art, wherefore the present invention is to be limited only by the full scope which can be legally accorded the appended claims.

I claim:

1. The combination of viable canine melanoma "cell line M" cells on a synthetic medium supporting the viability thereof, said medium comprising assimilable carbohydrate, assimilable protein or amino acids, nucleic acid, mineral, and vitamin components and, as a further element of the combination, a viable virus which is normally unindigenous to the canine melanoma "cell line M" cells, but which may be indigenous to a canine or other test animal and to which the canine melanoma "cell line M" cells are susceptible, growing in the culture of canine melanoma "cell line M" cells as host.

2. A method for the propagation of a virus which is normally unindigenous to canine melanoma "cell line M" cells but which may be indigenous to a canine or other test animal and to which said "cell line M" cells are susceptible, comprising the steps of propagating canine melanoma "cell line M" cells on a synthetic growth-promoting medium therefor comprising components essential for the growth thereof, introducing the said virus in viable state into the said canine melanoma "cell line M" culture, and thereafter providing growth-supporting conditions for the virus.

3. A vaccine comprising a canine virus which has been propagated in a viable canine melanoma "cell line M" cell culture on a synthetic medium as host therefor.

4. A vaccine of claim 3, additionally comprising at least one of whole and partial canine melanoma "cell line M" cells.

5. A method of producing a vaccine which comprises the steps of propagating a canine virus in a viable canine melanoma "cell line M" cell culture on a synthetic medium as host and harvesting the virus thus propagated.

6. A method of claim 5 which includes at least one of the steps of lyophilizing the harvested virus and diluting with a pharmacologically acceptable vaccine diluent to a desired concentration.

7. A method of attenuating a virus which comprises the steps of culturing canine melanoma "cell line M" cells on a synthetic medium therefor, introducing a virus which may be indigenous to a canine or other test animal and to which the canine melanoma "cell line M" cells are susceptible into the viable culture, providing virus growth-promoting conditions, harvesting the virus thus propagated, and repeating the procedure using the harvested virus until the virus is attenuated.

8. A method of attenuating a virus which may be indigenous to a canine or other test animal and to which canine melanoma "cell line M" cells are susceptible, comprising the steps of culturing canine melanoma "cell line M" cells on a synthetic medium therefor, and subjecting the virus to serial passage through a plurality of such canine melanoma "cell line M" cell cultures until the virus is attenuated.

9. A method for immunization against a canine virus in an animal susceptible to said canine viral infection comprising the step of administering to said animal an effective antiviral amount of a vaccine according to claim 3.

10. A method for immunization against a canine virus in an animal susceptible to said canine viral infection comprising the step of administering to said animal an effective antiviral amount of a vaccine according to claim 4.

References Cited

Kasza: Am. J. Vet. Res. 25 (107): 1178–1185, July 1964.

Pakes et al.: Am. J. Vet. Res. 26 (113): 837–843, July 1965.

Fowler et al.: Cancer Research 26 (I): 2409–2414, December 1966.

LEWIS GOTTS, *Primary Examiner.*

S. K. ROSE, *Assistant Examiner.*

U.S. Cl. X.R.

195—1.2, 1.3

UNITED STATES PATENT OFFICE
CERTIFICATE OF CORRECTION

Patent No. 3,432,595  
March 11, 1969

Louis Kasza

It is certified that error appears in the above identified patent and that said Letters Patent are hereby corrected as shown below:

Column 2, line 42, "partial cels" should read -- partial cells --. Column , line 66, "1:1" should read -- 1:10 --. Column 6, line 46, "37% C." should read -- 37° C. --; line 60, "into ta vaccine" should read -- into a vaccine --; line 74, "vacicne" should read -- vaccine --. Column 7, line 12, "cirus" should read -- virus --. Column 8, line 70, "370 C." should read -- 37° C. --.

Signed and sealed this 14th day of April 1970.

(SEAL)

Attest:

E. Fletcher, Jr.  
Officer

WILLIAM E. SCHUYLER, JR.  
Commissioner of Patents

UNITED STATES PATENT OFFICE
CERTIFICATE OF CORRECTION

Patent No. 3,432,595                                  March 11, 1969

Louis Kasza

It is certified that error appears in the above identified patent and that said Letters Patent are hereby corrected as shown below:

Column 9, line 56, "(a)" should read -- (e) --.

Signed and sealed this 22nd day of December 1970.

(SEAL)
Attest:

Edward M. Fletcher, Jr.                      WILLIAM E. SCHUYLER, JR.
Attesting Officer                                Commissioner of Patents